US007061890B2

(12) United States Patent
Kim et al.

(10) Patent No.: US 7,061,890 B2
(45) Date of Patent: Jun. 13, 2006

(54) METHOD FOR SELECTING RACH IN A CDMA MOBILE COMMUNICATION SYSTEM

(75) Inventors: Kyou-Woong Kim, Suwon (KR); Chang-Hoi Koo, Songnam (KR)

(73) Assignee: Samsung Electronics Co., Ltd. (KR)

( * ) Notice: Subject to any disclaimer, the term of this patent is extended or adjusted under 35 U.S.C. 154(b) by 661 days.

(21) Appl. No.: 09/873,618

(22) Filed: Jun. 4, 2001

(65) Prior Publication Data

US 2002/0041578 A1 Apr. 11, 2002

(30) Foreign Application Priority Data

| Jun. 2, 2000 | (KR) | ................................ 2000-30497 |
| Jun. 22, 2000 | (KR) | ................................ 2000-34609 |
| Jul. 4, 2000 | (KR) | ................................ 2000-38083 |

(51) Int. Cl.
*H04B 7/216* (2006.01)

(52) U.S. Cl. ...................... 370/335; 375/140
(58) Field of Classification Search ................ 370/320, 370/329, 335, 342; 375/140, 141, 146, 147
See application file for complete search history.

(56) References Cited

U.S. PATENT DOCUMENTS

| 5,430,760 | A | * | 7/1995 | Dent ........................... 375/144 |
| 5,544,196 | A | | 8/1996 | Tiedemann, Jr. et al. |
| 5,581,547 | A | * | 12/1996 | Umeda et al. .............. 370/342 |
| 6,154,454 | A | * | 11/2000 | Abe ............................ 370/335 |
| 6,477,670 | B1 | * | 11/2002 | Ahmadvand ................ 714/712 |
| 6,594,248 | B1 | * | 7/2003 | Karna et al. ................ 370/342 |
| 6,621,803 | B1 | * | 9/2003 | Halton et al. ............... 370/329 |
| 6,697,346 | B1 | * | 2/2004 | Halton et al. ............... 370/335 |

FOREIGN PATENT DOCUMENTS

| EP | 0 639 899 A1 | 3/1994 |
| EP | 0 993 214 A1 | 4/2000 |
| EP | 0 994 634 A2 | 4/2000 |
| JP | 7-504552 | 5/1995 |
| JP | 2688686 | 8/1997 |
| JP | 11-177522 | 7/1999 |
| JP | 2000-151494 | 5/2000 |

OTHER PUBLICATIONS

Supplementary European Search Report dated Oct. 30, 2002 issued in a couperpart application, namely, EP Appln. No. 01937007.

* cited by examiner

*Primary Examiner*—Ricky Q. Ngo
*Assistant Examiner*—Christine Ng
(74) *Attorney, Agent, or Firm*—Dilworth & Barrese LLP

(57) ABSTRACT

A method selecting a RACH comprises determining an access service class (ASC) associated with a unique access class of a user equipment (UE) by analyzing a radio resource control (RRC) message received from a UTRAN (UMTS (Universal Mobile Telecommunication System) Terrestrial Radio Access Network); receiving mapping information from the UTRAN; analyzing ASCs and scrambling codes to be used for available RACHs associated with each of the ASCs based on the received mapping information; mapping the analyzed scrambling codes to scrambling code groups associated with the ASCs; selecting a scrambling code group associated with the determined ASC; and selecting one of the scrambling codes using a total number of the scrambling codes mapped to the selected scrambling code group and a unique identifier of the UE.

12 Claims, 4 Drawing Sheets

METHOD FOR SELECTING RACH IN A CDMA MOBILE COMMUNICATION SYSTEM

PRIORITY

This application claims priority to an application entitled "Method for Assigning RACH in a CDMA Mobile Communication System" filed in the Korean Industrial Property Office on Jun. 2, 2000 and assigned Serial No. 2000-30497; an application entitled "Method for Selecting RACH in a CDMA Mobile Communication System" filed in the Korean Industrial Property Office on Jun. 22, 2000 and assigned Serial No. 2000-34609; and an application entitled "Method for Selecting RACH in a CDMA Mobile Communication System" filed in the Korean Industrial Property Office on Jul. 4, 2000 and assigned Serial No. 2000-38083, the contents of all of which are hereby incorporated by reference.

BACKGROUND OF THE INVENTION

1. Field of the Invention

The present invention relates generally to a channel assignment method in a CDMA mobile communication system, and in particular, to a method for assigning a random access channel (RACH).

2. Description of the Related Art

With the rapid growth of the mobile communication industry, a mobile communication system capable of supporting data and image services as well as the common voice service is required. Such a mobile communication is generally called a "future mobile communication system". The future mobile communication system commonly employs a CDMA (Code Division Multiple Access) technique, and is divided into a synchronous system and an asynchronous system, the standardization of the operations of which have been conducted separately. In particular, a European future mobile communication system is called a UMTS (Universal Mobile Telecommunication System). The standardization of the operations should define various specifications on the data and image services as well as the voice service, required in the future mobile communication system. A typical operating standard relates to channel assignment. The asynchronous UMTS or W-CDMA (Wideband CDMA) mobile communication system, which is the European future mobile communication system, uses a random access channel (RACH) and a common packet channel (CPCH) as uplink common channels. Concerning the uplink common channels for the W-CDMA mobile communication system, the RACH channel is accessed by user equipment (UE; or a mobile station in the synchronous CDMA-2000 system) when the UE has no channel connected to a UTRAN (UMTS Terrestrial Radio Access Network; or a base station in the synchronous CDMA-2000 system). In a message transmission procedure utilizing the RACH, the UE transmits a preamble using an access signature for RACH, and then, transmits a message upon receipt of an ACK signal in response to the transmitted preamble. Before transmission, the message transmitted by the UE is subjected to spreading by a selected scrambling code for the RACH.

To enable the UE to access the RACH, the UTRAN, also known as UTRAN Node-B, transmits PRACH (Physical RACH) system information available in a corresponding cell to every UE in the cell through a broadcast channel. Each UE, in the cell receives the PRACH system information message transmitted from the UTRAN over the broadcasting channel. Upon receipt of the PRACH system information message, a UE intending to transmit a message over the RACH must select one of the available scrambling codes included in the received PRACH system information message. Selecting one of the received RACH scrambling codes is performed in an RRC (Radio Resource Control) layer of the UE. The selection may also be performed even in a MAC (Medium Access Control) layer according to system implementations. Preferably, the scrambling codes to be used for the RACH must be selected such that they should be distributed uniformly or during overload control of the system.

The latest UMTS standard discloses only transmission of the PRACH system information message but does not specifically describe how the UE selects the RACH, i.e., how the UE selects a scrambling code for transmitting the PRACH system information. In addition, the latest UMTS standard does not specifically describe a plan to uniformly distribute the scrambling codes to be used for the RACH. Therefore, when the UEs select the same RACH scrambling code, a collision probability between RACH transmission messages will be increased, leading to performance degradation of the UEs and a reduction in a transmission success rate of the RACH message. In addition, the frequency collisions cause an increase in the number of accesses, thereby resulting in a reduction in a battery-run time of the UE.

SUMMARY OF THE INVENTION

It is, therefore, an object of the present invention to provide a method for minimizing collisions of a random access channel (RACH) transmission messages uniquely assigned to every UE through efficient management and utilization of the RACH.

It is another object of the present invention to provide an RACH scrambling code assignment method for minimizing collisions of the RACH messages by uniformly distributing RACHs available in the same cell to the UEs in the cell.

It is further another object of the present invention to provide an RACH assignment method for improving performance of the UEs and minimizing battery power consumption by uniformly distributing RACHs available in the same cell to the UEs in the cell.

It is yet another object of the present invention to provide an RACH assignment method for assigning more RACH scrambling codes to a UE having a higher priority, by classifying available RACH scrambling codes according to an access service class of the UEs and traffic density in the cell.

It is still another object of the present invention to provide an RACH assignment method for minimizing collisions which may occur when the UE receives an RACH message, by increasing the number of available PRACH scrambling codes as the traffic density in the cell increases.

It is still another object of the present invention to provide a method for controlling system overload by selecting a scrambling code according to a persistence value assigned to the UE.

To achieve the above and other objects, there is provided a method selecting a RACH. The method comprises: determining an access service class (ASC) associated with a unique access class of a UE by analyzing a radio resource control (RRC) message received from a UTRAN; receiving mapping information from the UTRAN; analyzing ASCs and scrambling codes to be used for available RACHs associated with each of the ASCs based on the received mapping information from UTRAN; mapping the analyzed scrambling codes to scrambling code groups associated with the ASCs; selecting a scrambling code group associated with the determined ASC; and selecting one of the scrambling codes using a total number of the scrambling codes mapped to the selected scrambling code group and a unique identifier of the UE.

Preferably, the selected scrambling code has a serial number defined as a remainder obtained by dividing the unique identifier of the UE by the total number of the scrambling codes.

Preferably, the selected scrambling code has a serial number defined as a remainder obtained by dividing the unique identifier of the UE by a quotient obtained by dividing the total number of the scrambling codes by a persistence level transmitted from the UTRAN.

Preferably, the persistence level is determined according to a priority of the UE, and is set to a lower value for a UE with a higher priority.

Preferably, the scrambling codes to be used for the available RACHs associated with each of the ASCs are determined by a start index and an end index of a group of available RACHs, constituting the mapping information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In an exemplary embodiment of the present invention, a UE (or W-CDMA UE System) receiving PRACH system information transmitted from a UTRAN, is required to include a USIM (UMTS Subscriber ID Module) for storing a UE ID used to identify the UE and also for storing an access service class (ASC) of the UE. The UE ID used for identifying the UE may include IMSI (International Mobile Station ID), TMSI (Temporal Mobile Subscriber ID), IMEI (International Mobile Equipment ID), and PMSI (Packet Mobile Subscriber ID).

Figure 1:
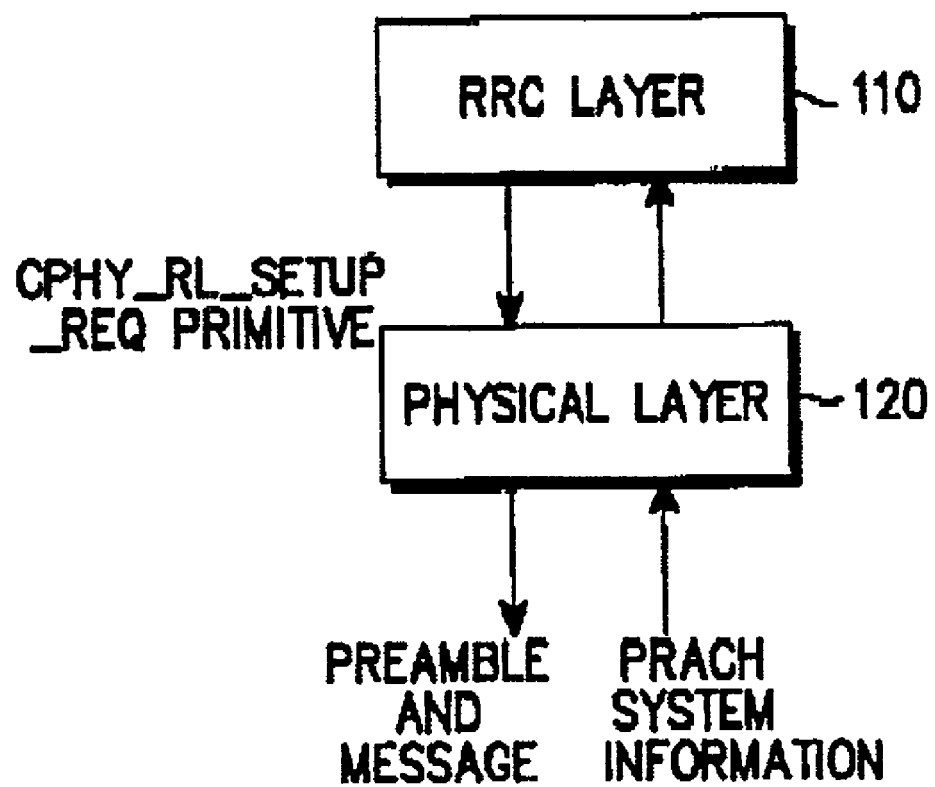
FIG. 1 is a diagram illustrating a layered structure of a UE according to an embodiment of the present invention.

FIG. 1 illustrates a layered structure of the UE according to an embodiment of the present invention. Referring to FIG. 1, a physical layer 120 receives PRACH system information message from a UTRAN over a physical channel, and provides the received PRACH system information message to its upper layer, i.e., an RRC layer 110. The PRACH system information message includes information on the number of PRACH scrambling codes available in the UTRAN. The RRC layer 110 determines (selects) a scrambling code to use depending on the information on the number of the available PRACH scrambling codes received from the UTRAN, and then provides the selected scrambling code to the physical layer 120 through a CPHY_RL_SETUP_REQ primitive. The physical layer 120 spreads a preamble and a message using the selected PRACH scrambling code and then transmits the spread preamble and message to the UTRAN. That is, the CPHY_RL_SETUP_REQ primitive provided from the RRC layer 110 to the physical layer 120 includes information about the selected scrambling code. It is the physical layer 120 that generates a scrambling code based on the scrambling code information included in the CPHY_RL_SETUP_REQ primitive and then spreads a preamble and a message to transmit using the generated scrambling code.

As described above, the RRC layer 110 can select one of the PRACH scrambling codes available in the cell using the ASC information and the PRACH system information provided from the UTRAN. That is, the RRC layer 110 selects a PRACH scrambling code to use depending on the PRACH system information provided from the UTRAN, and then provides the selected PRACH scrambling code information to the physical layer 120 through the CPHY_RL_SETUP_REQ primitive.

Figure 2:
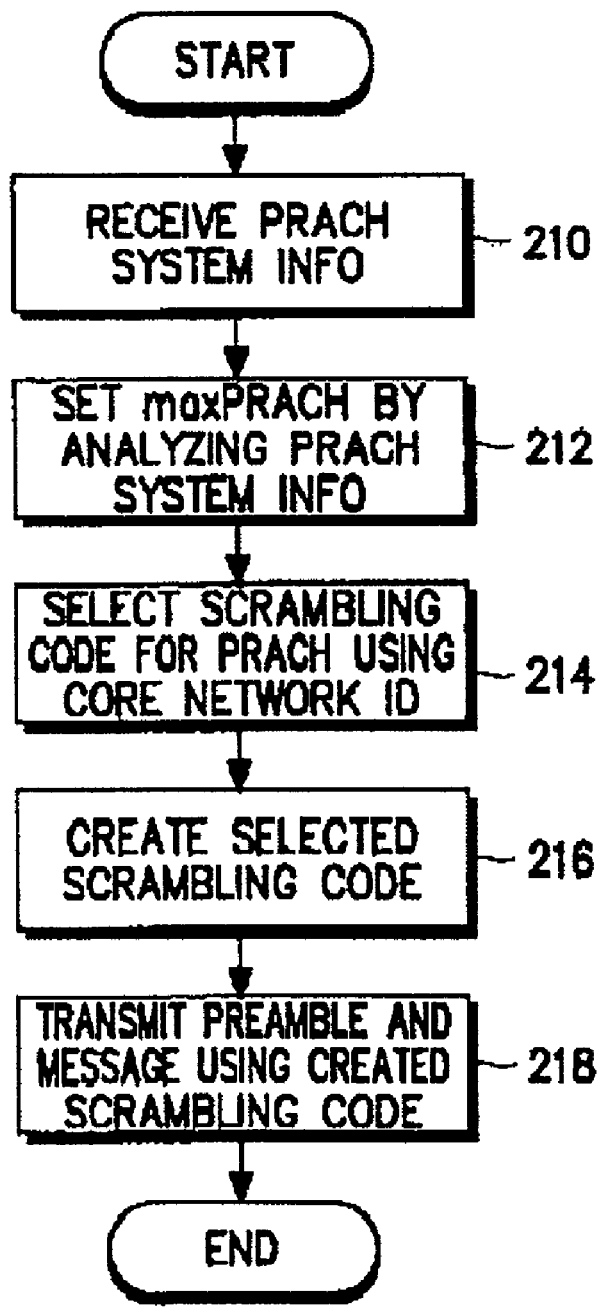
FIG. 2 is a flow chart illustrating a procedure for selecting an RACH scrambling code in an RRC layer of the UE according to a first embodiment of the present invention.
Figure 3:
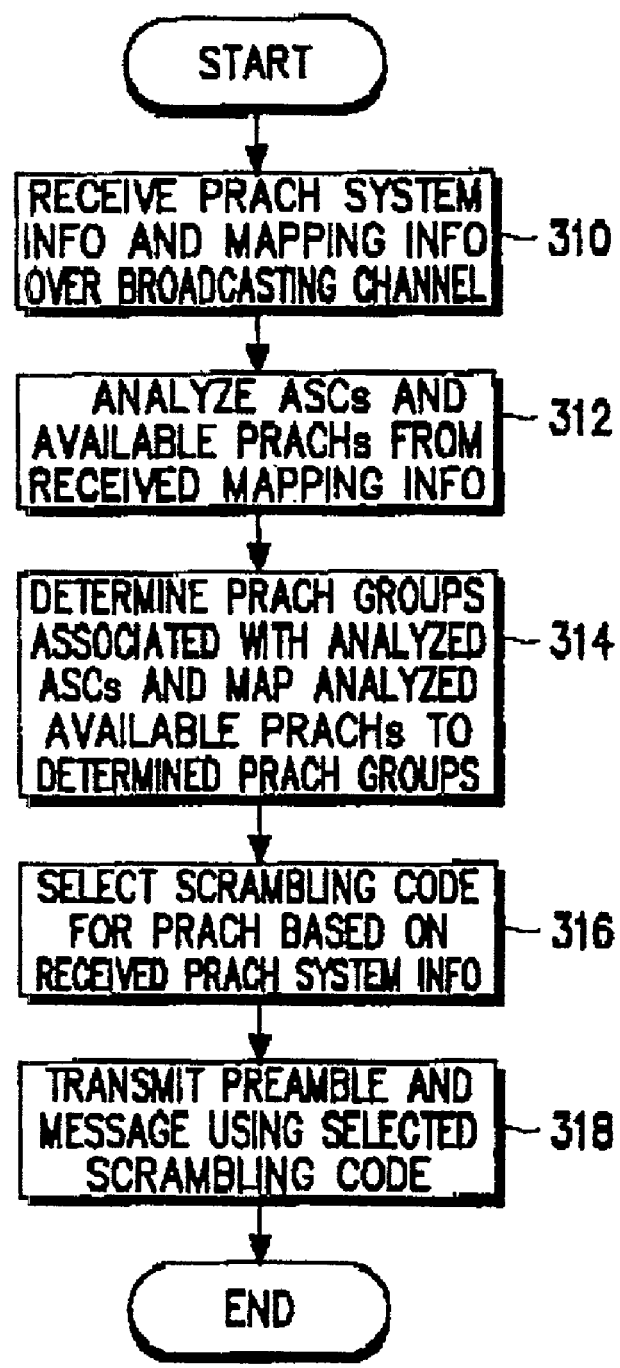
FIG. 3 is a flow chart illustrating a procedure for selecting a PRACH scrambling code in the RRC layer of the UE according to a second embodiment of the present invention.
Figure 4:
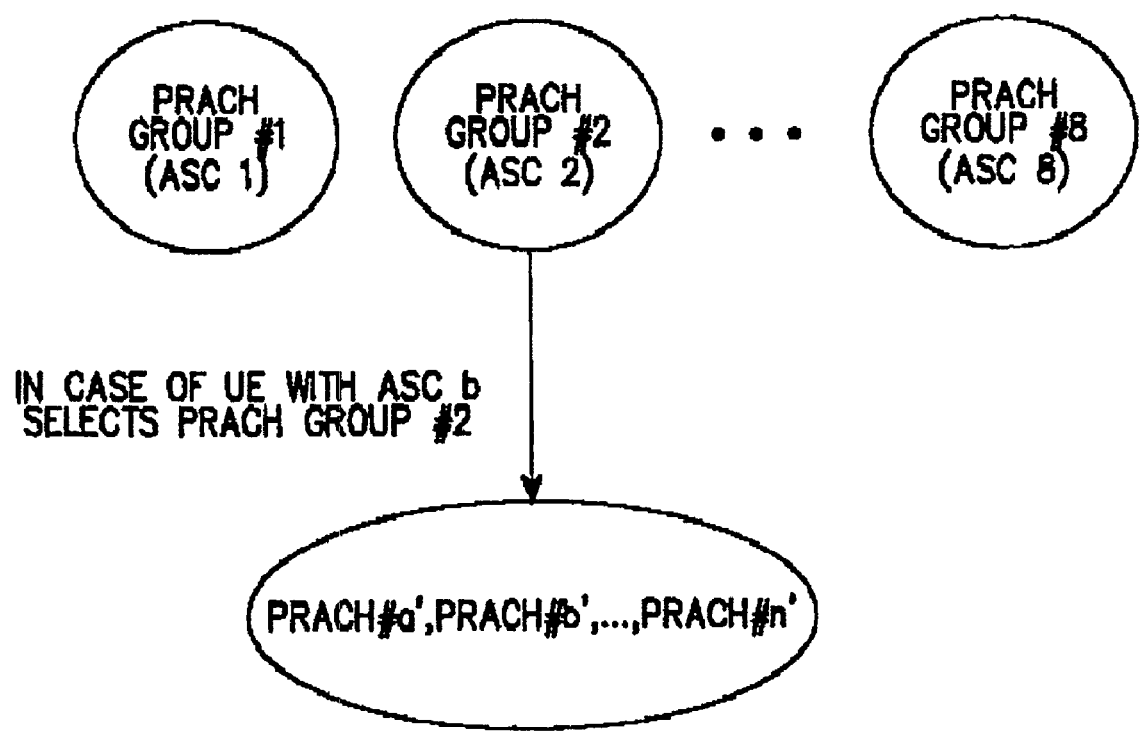
FIG. 4 is a diagram illustrating a mapping table according to an embodiment of the present invention.

FIG. 2 illustrates a procedure for selecting a PRACH scrambling code in the RRC layer 110 of the UE according to a first embodiment of the present invention. The first embodiment shown in FIG. 2 includes a process of selecting a scrambling code to use depending on received PRACH system information message from UTRAN and then transmitting a preamble and a message to the UTRAN using the selected scrambling code. FIG. 3 illustrates a procedure for selecting a PRACH scrambling code in the RRC layer 110 of the UE according to a second embodiment of the present invention. FIG. 4 illustrates a mapping table according to an embodiment of the present invention.

A detailed description of the embodiments will be made with reference to accompanying drawings. The UTRAN transmits PRACH system information message with the number of PRACH scrambling codes available in its serving cell through the broadcasting channel, so that the UEs existing in the cell can select the PRACH scrambling codes. To this end, the UTRAN uses a predefined message, which is shown in Table 1 below, by way of example.

TABLE 1

| Information Element | Need | Multi | Type and Reference |
|---|---|---|---|
| PRACH system information | MP | maxPRACH | |
| PRACH info | MP | | PRACH info (for RACH) |

Referring to above Table 1, "Multi" means the repetition number of PRACH info in a PRACH system information message. More specifically, the PRACH Info with the number of maxPRACH are included in the PRACH System Information Message. In addition, "MP" means mandatory and "Need" defines if the information element is optional or mandatory.

The PRACH system information message transmitted from the UTRAN is provided to every UE in the cell being serviced by the UTRAN. Meanwhile, upon receipt of the PRACH system information message provided from the UTRAN, the UE transmits a message using the PRACH in accordance with the process shown in FIG. 2.

More specifically, the physical layer 120 of the UE receives PRACH system information message from the UTRAN over a physical channel in step 210 of FIG. 2. The physical layer 120 then provides the received PRACH system information message to its upper layer of the RRC layer 110.

Upon receipt of the PRACH system information message, the RRC layer 110 performs step 212 of FIG. 2. In step 212, the RRC layer 110 analyzes the PRACH system information message provided from the physical layer 120, in order to calculate the total number of the PRACH scrambling codes available in the cell (maxPRACH). The PRACH Infos with the number of maxPRACH are included in PRACH System Information Message. The calculated maxPRACH is set as N-PRACH (the number of PRACHs). Thereafter, in step 214, the RRC layer 10 selects a scrambling code for PRACH to use based on the set N-PRACH and the UE ID (i.e., TMSI, IMEI, IMSI or PMSI). The PRACH to be used can be calculated in accordance with Equation (1) below.

$$PRACH_{No} = IMSI \% N\text{-}PRACH \tag{1}$$

In Equation (1), $PRACH_{No}$ indicates a code number of the selected PRACH scrambling code. As shown in Equation (1), $PRACH_{No}$ is determined by a remainder obtained by dividing IMSI by N-PRACH, i.e., determined by a modulo operation (see step 214). In Equation (1), IMSI is used for UE ID by way of example.

After selecting the scrambling code for PRACH in accordance with Equation (1), the RRC layer 110 includes the selected scrambling code number in the CPHY_RI_SETUP_REQ primitive and provides the physical layer 120 with the CPHY_RI_SETUP_REQ primitive. In step 216, the physical layer 120 creates a scrambling code according to the provided scrambling code number. In step 218, the physical layer 120 transmits a preamble and a message using the created scrambling code. The process of transmitting the preamble and the message using the created scrambling code is well known in this technical field. In-the first embodiment, every UE located in the same cell selects a PRACH to use depending on the same PRACH system information message provided from the UTRAN. In the second embodiment of the present invention, every UE is designated a different PRACH scrambling code group, and selects one of the PRACH scrambling codes included in the PRACH scrambling code group to which the UE belongs. That is, in the second embodiment of the present invention, the available PRACH scrambling codes are grouped according to an access service class (ASC) of the UEs in the same cell, thereby to select a PRACH scrambling code. To this end, the UTRAN must transmit mapping information between the ASCs and the scrambling code groups, together with the PRACH system information over the broadcasting channel. Thus, the UE can select a PRACH scrambling code from the PRACH scrambling code group associated with its ASC, received from the UTRAN over the broadcasting channel. In the second embodiment of the present invention, the UEs must previously determine their unique scrambling code groups. Specifically describing this process, every UE has a unique ASC (Access Service Class) determined during its manufacturing process. Further, the UTRAN transmits an RRC message designating ASCs, so that the UE receives the RRC message from the UTRAN and determines an ASC.

After determining its scrambling code group, the UE selects a PRACH scrambling code to use in the following operation.

Table 2 below shows exemplary PRACH mapping information transmitted by the UTRAN to enable the UE to select the PRACH scrambling code according to ASC.

TABLE 2

| Information Element/Group Name | Need | Multi | Type and reference |
|---|---|---|---|
| Access Service Class | MP | 1 to 8 | |
| >Available PRACH Start Index | MP | | Integer(0..maxPRACH) |
| >Available PRACH End Index | MP | | Integer(0..maxPRACH) |

A description of the second embodiment will be made below with reference to Table 2 and FIG. 3. The RRC layer 110 of the UE receives the mapping, information shown in Table 2 and the PRACH system information in step 310. The mapping information containing ASC and PRACH and the PRACH system information are received at the physical layer 120 from the UTRAN and then provided to the RRC layer 110.

After receiving the mapping information containing ASC and PRACH in step 310, the RRC layer 110 analyzes the ASCs from the received mapping information in step 312. The ASCs are information used in determining the number of PRACH scrambling code groups. The RRC layer 110 also analyzes the number of PRACH scrambling codes available for each scrambling code group based on the received mapping information. The number of PRACH scrambling codes available for each scrambling code group is determined by "Available PRACH Start Index" and "Available PRACH End Index" shown in Table 2.

In step 314, the RRC layer 110 constructs a mapping table by determining the PRACH scrambling code groups according to the analyzed ASCs and then determining the PRACH scrambling codes belonging to the respective groups. For example, assuming that there exist 8 ASCs ASC#1–ASC#8 as shown in Table 2, the mapping table may have a structure shown in FIG. 4. As illustrated in FIG. 4, 8 PRACH groups are determined in association with the ASCs ASC#1–ASC#8. Meanwhile, the PRACH scrambling codes belonging to the determined 8 PRACH groups are determined by "Available PRACH Start Index" and "Available PRACH End Index." That is, the PRACH scrambling codes of the first PRACH scrambling code group are determined between the first scrambling code designated by "Available PRACH Start Index" and the last scrambling code designated by "Available PRACH End Index." The PRACH scrambling codes belonging to the second PRACH scrambling code group can also be determined in the same method as used in determining the available PRACH scrambling codes of the first PRACH scrambling code group.

Meanwhile, Table 2 shows an example where the ASCs are classified into 8 groups ASC#1–ASC#8. "Available PRACH Start Index" and "Available PRACH End Index" indicate indexes of the PRACH scrambling codes belonging to the grouped ASCs. That is, the UTRAN assigns a number of from 1 to 8 to the ASC groups, and then, sets "Available PRACH Start Index" and "Available PRACH End Index" so as to inform the UE of the scrambling codes belonging to the respective ASC groups. Thus, the UE can select one of the available scrambling codes according to the ASC to which it belongs.

After determining the available PRACH scrambling codes in association with the PRACH scrambling code groups (ASC groups), the RRC layer 110 selects a PRACH scrambling code group associated with the UE's ASC determined previously. FIG. 4 shows an example where the UE is determined to have ASC#2 and thus selects the PRACH scrambling code group #2. When the PRACH scrambling code group designated to the UE is determined, the RRC layer 110 selects one of the available scrambling codes from the UE's code group based on the received PRACH system information, in step 316. The RRC layer 110 then transmits a preamble and a message using the selected scrambling code in step 318. Since the process of steps 316 and 318 is performed in the same way as in the first embodiment described with reference to FIG. 2, the detailed description will not be provided. However, in steps 316 and 318, the UE selects the PRACH scrambling code not from the whole available PRACH scrambling codes provided from the UTRAN, but from only the scrambling codes belonging to the determined PRACH scrambling code group.

Table 3 below shows an example of the PRACH system information embodied by including the PRACH mapping information of Table 2 in the PRACH system information of Table 1.

TABLE 3

| Information Element | Need | Multi | Type and Reference |
| --- | --- | --- | --- |
| PRACH System Information | MP | 1..<maxPRACH> | |
| >PRACH Info | MP | | PRACH Info (for RACH) |
| >PRACH Mapping Info | OP | | |

In Table 3, "OP" means Optional and "MP" means Mandatory. And, in Table 3, ">PRACH Mapping Info" includes the structure shown in Table 2, and the other information excepting ">PRACH Mapping Info" is equal to that shown in Table 1.

In the case where the invention is embodied by Table 3, the UE will select the PRACH scrambling code in the following procedure. First, the UE determines its ASC depending on the RRC message provided from the UTRAN. Thereafter, upon receipt of the PRACH system information shown in Table 3, the UE constructs a mapping table using ASC, "Available PRACH Start Index" and "Available PRACH End Index" of the received PRACH system information. After constructing the mapping table, the UE selects any one of the PRACH scrambling code groups in the mapping table according to its ASC previously determined. After selecting the PRACH scrambling code group, the UE can select a PRACH scrambling code number by applying the number, N-PRACH, of the PRACH scrambling codes belonging to the selected PRACH scrambling code group to Equation (1). After selecting the PRACH scrambling code number to use, the RRC layer 110 provides the selected scrambling code number to the physical layer 120 by inserting it in the CPHY_RL_SETUP_REQ primitive. The physical layer 120 then creates a PRACH scrambling code using the provided scrambling code number, spreads the created scrambling code with the preamble and message, and then transmits the spread data to the UTRAN.

The mapping information between the ASCs and the scrambling code groups transmitted to the UE by the UTRAN to select the scrambling code can also be constructed in a new information element (IE) format. That is, a PRACH system information list message has PRACH mapping information shown in Table 3, and the PRACH mapping information message is constructed as shown in Table 2. In another embodiment, the UTRAN can transmit the PRACH mapping information of Table 2 to PRACH partitioning information message transmitted to the UE. The PRACH partitioning information is a message block for transmitting information about access subchannels and available signatures according to ASC, and can also transmit the mapping information proposed in the invention to the UTRAN. Even in this method, the UE has the same operation but only the message block for transmitting the related information is slightly changed.

Now, as mentioned above, a more detailed description will be made on other embodiments of selecting the PRACH scrambling code to be used by the UE. Since the first embodiment has been described above, the description will be provided from the second embodiment.

1. Second Embodiment

In order to set up a PRACH between the UE and the UTRAN, PRACH resources, i.e., an access slot and a preamble signature, must be defined. Such resources are used to efficiently utilize the RACH. The UE calculates a persistence value used for efficient access control, using a persistence level receive d through the RRC message, and uses the calculated persistence value as an access parameter. Here, the persistence level transmit to the UE is defined as an integer of from 1 to 8, and is broadcast with a system information block #5 (SIB#5).

The UTRAN transmits mapping information messages containing the persistence level and the PRACH together with the PRACH system information, in order to assign the PRACH according to the persistence level. Table 4 below shows a message format transmit to the UE by the UTRAN to embody the second embodiment.

TABLE 4

| Information Element/ Group Name | Need | Multi | Type and Reference | Semantics Description |
| --- | --- | --- | --- | --- |
| Access Service Class Persistence Level | MP | 1 to 8 | | |
| >Available PRACH Start Index | MP | | Integer(0..maxPRACH count) | Start index for available scrambling code for PRACH |
| >Available PRACH End Index | MP | | Integer(0..maxPRACH count) | End index for available scrambling code for PRACH |

To this end, the PRACH system information should be changed as compared to the system information contained in Table 3 above. As to the PRACH process, the RRC layer 110 selects a PRACH group (ASC) according to the persistence level and then selects a PRACH to use by applying Equation (1). The RRC layer 110 sends the selected scrambling code to the physical layer 120 by inserting the scrambling code in the CPHY_RL_SETUP_REQ primitive. As shown in FIG. 4, if the persistence level of the UE is '2', the RRC layer 110 selects the PRACH to use from the PRACHs PRACH#a–PRACH#n included in the PRACH group #2. As mentioned above, if the number of the PRACHs in the PRACH group #2 is N-PRACH, the PRACH to be used is in accordance with Equation (1) above.

2. Third Embodiment

An access attempt probability of the UE is determined according to a persistence level transmitted from the UTRAN to the UE. A decrease in the persistence level causes an increase in a probability that the UE will access the URAN through the RACH. Therefore, by controlling assignment and selection of a PRACH scrambling code using the persistence level, it is also possible to control an access success probability among UEs existing in one cell. That is, by increasing the number of available scrambling codes at a low persistence level and decreasing the number of available scrambling codes at a high persistence level, it is possible to decrease a PRACH collision probability among UEs with high priority, thereby guaranteeing a high access success probability. But, the collision probability among the UEs with low priority is increased causing a decrease in the access success probability, so that it is not possible to guarantee data transmission through the RACH of the UE with a low priority. To implement this, it is possible to assign the scrambling codes as follows.

First, it is necessary to assign a group index indicating a scrambling code assigned to the persistence level. Such assignment can be defined through an RRC message shown in Table 4, broadcast from the UTRAN to the UE. In addition, the mapping information defined in Table 4 between the persistence level and the scrambling code group must be inserted into "PRACH System Info" shown in Table 3. As stated above, it is necessary to increase the number of available scrambling codes at a low persistence level having a high access success probability; otherwise, it is necessary to restrict the number of the available scrambling codes. Equation (2) below shows a scrambling code selected according to the persistence level.

$$PRACH\# = IMSI \% \lfloor N/K \rfloor \quad (2)$$

In Equation (2), N indicates maxPRACH, and K indicates a success rate, which can be a persistence level or a persistence level number. When K indicates the persistence level, it is possible to select the scrambling code by applying the current RRC message value to Equation (2). However, when K indicates the persistence level number, an RRC message's IE (Information Element) indicating a dynamic persistence level must be changed as shown in Table 5 below.

TABLE 5

| Information Element/ Group Name | Need | Multi | Type and reference | Semantics Description |
| --- | --- | --- | --- | --- |
| Dynamic Persistence Level | MP | | Integer (1..8) | Level shall be mapped to a dynamic persistence value in the range 0..1 |
| >Persistence Level Number | MP | | Integer (1..8) | persistance level number for PRACH scrambling code |

As shown in Table 5, the persistence level number is 1 to 8. If this value is 1, the UE can select the scrambling codes as many as maxPRACH, thereby making it possible to minimize collisions due to overlapped scrambling codes. However, if this value is 8, the UE can select one scrambling code from a minimum of 1 scrambling code or a maximum of 2 scrambling codes, so that it is possible to restrict access to the PRACH.

3. Fourth Embodiment

In this embodiment, selection of the scrambling code is performed in the MAC layer, not in the RRC layer.

The MAC layer receives the persistence value calculated in the RRC layer in accordance with Equation (3) below, and then performs a persistence test on the received persistence value.

$$Pi = 2^{-(k-1)} \quad (3)$$

The persistence value calculated by Equation (3) is compared with a value R randomly generated for the persistence test. The randomly generated value R is determined to have a value (in increments of 0.1 unit) between 0 and 1, and accessibility is determined according to Condition (1) below.

Condition (1)

R≦Pi: Assignment Succeeded

R>Pi: Assignment Failed

It is noted from Condition (1) that the UE can start to access the RACH only when R≦Pi. A PRACH scrambling code used when the UE selects PRACH using the generated value R is determined in accordance with Equation (4) below.

$$PRACH\# = (\lfloor R \times 8 \times maxPRACH \rfloor) \% maxPRACH \quad (4)$$

In Equation (4), PRACH# indicates a scrambling code number selected by the UE, $\lfloor i \rfloor$ is a maximum integer that is less than or equal to i, and maxPRACH indicates the maximum number of the PRACH scrambling codes assigned to one UE by the UTRAN. Equation (4) shows a value dependent on the result of the persistence test performed by a certain UE, and the scrambling code can be selected only when the persistence test is succeeded. The MAC layer transmits the scrambling code selected by Equation (4) to the physical layer together with a PHY_DATA_REQ primitive, so that the physical layer uses the scrambling code in transmitting access preamble and message parts of the PRACH.

As described above, the present invention uniformly distributes the RACHs so that every UE in the same cell can select its RACH, thereby reducing collisions among the RACHs selected by different UEs during channel access. In addition, by selecting the RACH to use according to ASC of the UE, it is possible to efficiently manage the RACHs. By doing so, it is possible to reduce accesses to the RACH by the UE, contributing to a reduction in battery power consumption of the UE. In addition, by assigning the scrambling code according to the persistence level, it is possible to control system load using the persistence level transmitted from the UTRAN for access control of the UE.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for selecting a random access channel (RACH) scrambling code from a plurality of scrambling codes by a (user equipment) UE in a CDMA (Code Division Multiple Access) mobile communication system including a UTRAN (UMTS (Universal Mobile Telecommunication System) Terrestrial Radio Access Network), comprising the steps of:

transmitting information for a plurality of scrambling codes having serial numbers associated with random access channels(RACHs) from the UTRAN to the UEs; and selecting a scrambling code from a plurality of scrambling codes by a UE (User Equipment), wherein each UE selects the scrambling code from the plurality of scrambling codes using a unique identifier specified by each of the plurality of UEs,
wherein the scrambling code selected by the UE has a serial number defined as a remainder obtained by dividing the specified unique identifier by a quotient obtained by dividing a total number of the plurality of scrambling codes by a persistence level transmitted from the UTRAN.

2. The method as claimed in claim 1, wherein the persistence level is determined according to a priority of the UE.

3. The method as claimed in claim 1, wherein the persistence level is set to a lower value for a UE with a higher priority.

4. A method for selecting a random access channel (RACH), comprising the steps of:
receiving RACH system information message from a UTRAN (UMTS (Universal Mobile Telecommunication System) Terrestrial Radio Access Network), and determining a total number of RACHs available in a cell depending on the received RACH system information; and
selecting a scrambling code for one of the RACHs using the determined total number of the RACHs and a unique identifier of a user equipment (UE),
wherein the selected scrambling code has a serial number defined as a remainder obtained by dividing the unique identifier of the UE by a quotient obtained by dividing the total number of the RACHs by a persistence level transmitted from the UTRAN.

5. The method as claimed in claim 4, wherein the persistence level is determined according to a priority of the UE.

6. The method as claimed in claim 4, wherein the persistence level is set to a lower value for a UE with a higher priority.

7. A method selecting a random access channel (RACH), comprising the steps of:
determining an access service class (ASC) associated with a unique access class of a user equipment (UE) by analyzing a radio resource control (RRC) message received from a UTRAN (UMTS (Universal Mobile Telecommunication System) Terrestrial Radio Access Network);
receiving mapping information message between the ASC and PRACH from the UTRAN and analyzing ASCs and scrambling codes to be used for available RACHs associated with each of the ASCs based on the received mapping information;
mapping the analyzed scrambling codes to scrambling code groups associated with the ASCs;
selecting a scrambling code group associated with the determined ASC; and
selecting one of the scrambling codes using a total number of the scrambling codes mapped to the selected scrambling code group and a unique identifier of the UE,
wherein the selected scrambling code has a serial number defined as a remainder obtained by dividing the unique identifier of the UE by the total number of the scrambling codes.

8. The method as claimed in claim 11, wherein the remainder is further divided by a persistence level transmitted from the UTRAN.

9. The method as claimed in claim 8, wherein the persistence level is determined according to a priority of the UE.

10. The method as claimed in claim 8, wherein the persistence level is set to a lower value for a UE with a higher priority.

11. The method as claimed in claim 7, wherein the scrambling codes to be used for the available RACHs associated with each of the ASCs are determined by a start index and an end index of a group of available RACHS, constituting the mapping information.

12. A method for selecting a scrambling code from a plurality of scrambling codes by a UE (user equipment) in a CDMA (Code Division Multiple Access) mobile communication system including a UTRAN (UMTS (Universal Mobile Telecommunication System) Terrestrial Radio Access Network), and transmitting a plurality of scrambling codes having serial numbers associated with RACHs (random access channel) from the UTRAN to the plurality of UEs, comprising the steps of:
determining a persistence value by substituting a persistence level provided from the UTRAN to each UE, said persistence value defined by $Pi=2^{-(k-1)}$;
determining a value R between 0 and 1;
determining whether the persistence value is larger than or equal to the value R; and
if the persistence value is larger than or equal to the value R, selecting a scrambling code by the UE by using the value R, a unique identifier of each UE and a total number of the scrambling codes (maxPRACH), wherein the selected scrambling code is defined by:
PRACH#=($\lfloor$R×8×maxPRACH$\rfloor$) % maxPRACH,
where $\lfloor i \rfloor$ is a maximum integer that is less than or equal to i.

* * * * *